(12) United States Patent
Strandberg

(10) Patent No.: US 6,760,323 B1
(45) Date of Patent: Jul. 6, 2004

(54) SYSTEM AND METHOD FOR PROVIDING AUDIO COMMUNICATION OVER A COMPUTER NETWORK USING DIFFERING COMMUNICATION FORMATS

(75) Inventor: Malcom B. Strandberg, Cambridge, MA (US)

(73) Assignee: Concerto Software, Inc., Westford, MA (US)

(*) Notice: Subject to any disclaimer, the term of this patent is extended or adjusted under 35 U.S.C. 154(b) by 0 days.

(21) Appl. No.: 09/244,446

(22) Filed: Feb. 4, 1999

(51) Int. Cl.[7] .............................................. H04L 12/66
(52) U.S. Cl. ................................... 370/352; 379/93.07
(58) Field of Search ................................ 370/351–356, 370/401, 402, 466, 467, 481, 493, 494, 495, 428, 389, 392, 418, 395.52, 395.61; 379/90.1, 93.07, 93.08, 93.09, 114.15

(56) References Cited

U.S. PATENT DOCUMENTS

| | | | | |
|---|---|---|---|---|
| 5,610,910 A | * | 3/1997 | Focsaneanu et al. | 370/351 |
| 5,768,350 A | * | 6/1998 | Venkatakrishnan | 379/93.09 |
| 5,867,494 A | * | 2/1999 | Krishnaswamy et al. | 370/352 |
| 5,892,764 A | * | 4/1999 | Riemann et al. | 370/395.52 |
| 6,134,235 A | * | 10/2000 | Goldman et al. | 370/352 |
| 6,141,341 A | * | 10/2000 | Jones et al. | 370/352 |
| 6,295,293 B1 | * | 9/2001 | Tonnby et al. | 370/351 |
| 6,320,857 B1 | * | 11/2001 | Tonnby et al. | 370/352 |
| 6,345,047 B1 | * | 2/2002 | Regnier | 370/351 |

OTHER PUBLICATIONS

Press Release, "IDT Announces Major Breakthrough That Will Allow Worldwide PC–to–Telephone Calls Over the Internet", Oct. 23, 1995, 2 page release, Hackensack, NJ.
Press Release, "IDT to Unveil Net2Phone at COMDEX; Revolutionary System Uses Internet to Make Overseas PC–to–Telephone Calls for 10 Cents a Minute", Nov. 6, 1995, 2 page release, Hackensack, NJ.
Network World, "Special Focus—Voice Over IP" by Tim Greene, Nov. 25, 1996, p. 24.

* cited by examiner

Primary Examiner—Steven H. D Nguyen
Assistant Examiner—Phuongchau Ba Nguyen
(74) Attorney, Agent, or Firm—Bourque & Associates, P.A.

(57) ABSTRACT

A system and method for providing audio communication over a computer network between sending and destination devices using differing communication formats is provided. The system identifies the format of the incoming digital encoded audio data signal, identifies the destination device format of the signal, and converts the data to a second digital encoded audio data signal which is compatible with the format utilized by the destination device.

11 Claims, 3 Drawing Sheets

SYSTEM AND METHOD FOR PROVIDING AUDIO COMMUNICATION OVER A COMPUTER NETWORK USING DIFFERING COMMUNICATION FORMATS

FIELD OF THE INVENTION

This invention relates to audio communication systems and more particularly, to an audio communication system which will interface and convert one format of computer network transmittable audio data to another format.

BACKGROUND OF THE INVENTION

Until recently, almost all voice and fax communication between remote locations was carried over the public switched telephone network (PSTN). The PSTN provides a circuit switch signal path between two or more parties wishing to communicate with one another, that is, the signal path which is to be used exclusively by the parties is established and maintained throughout the communication. A party wishing to communicate with another having a compatible device, whether by voice, fax, or data, dials the appropriate telephone number and the PSTN will connect the two parties, or two fax machines, or two data terminals, by creating a dedicated, continuous, signal path between the parties. Thus, the parties have a continuous two-way communication link established between them for the duration of their usage.

In the last decade, large scale high speed computer networks have been developed which utilize packet switching technologies. A packet switched network is entirely different than the circuit switched PSTN. A packet switched network is one in which discrete packets of data are routed, as required, between users. Thus, a packet switched network is one which connects two parties wishing to communicate only when there is data to transmit between those two parties.

An example of a packet switched network is the Internet-World Wide Web. The Internet-World Wide Web packet switched network may be accessed by a user through an "internet provider" via a local phone connection, across the circuit switched PSTN. Alternatively, users at schools or corporations can access the internet directly via network cards in a PC or workstation. Once connected to the Internet-World Wide Web, a user may send data to any other user having access to this network. This connectivity appears to be a local telephone call to the local phone company, even though the other party may be located across town, across the state, across the country, or across the world.

Although the packet switched networks were originally developed to transmit data and text in a digital format, technology has progressed to allow packets of data containing digitized voice or audio signals to be passed through the network to establish voice or audio communication between different users. Although the audio quality is not as high as with the PSTN, this method of audio communication may, nonetheless, be extremely advantageous in terms of the cost per call, since each call will appear to each user to be a local telephone call, regardless of where the other party is located. Additionally, improvements in technology are constantly increasing audio quality.

Several companies have developed their own proprietary systems which allow users to transmit audio information over the Internet-World Wide Web. The disadvantage of the current state of the art of these packet switched voice or audio systems is that in general, one system is not compatible with another. Thus, two parties wishing to exchange audio data across a packet switched computer network, such as the Internet-World Wide Web, must be using the same packet switched voice communication package, or else no communication between the two parties will be possible. Also, some of the new audio compression algorithms can only be processed by fast (pentium) processors. If connecting to a slower PC, a less effective compression algorithm must be used, resulting in an inability to exchange compressed audio data between systems having different processor speeds. A translation system can be located at a corporate site, thus allowing conversions to easier compression rates at a company's local network. Another disadvantage of the current state of the art of these systems is that in general, they are not compatible with the PSTN. Thus, it is not currently possible for a party utilizing one of these systems providing audio communication over a packet switched data network to communicate with a telephone connected to the PSTN.

Accordingly, what is needed is a system and method for providing an ability to translate from one packet switched voice communication system to another different packet switched voice communication system in order to allow users previously unable to exchange audio data to now communicate over a computer network. In addition, what is needed is a system and method for providing an interface between a packet switched voice system, such as the Internet-World Wide Web, and the PSTN. This would enable users on the Internet-World Wide Web to communicate with a standard telephone user connected to the PSTN.

SUMMARY OF THE INVENTION

The present invention provides a system and method for providing audio communications over a computer network using differing communication formats. In one embodiment, the system receives a first digital encoded audio data signal, which is encoded in a first data format. The system will first strip out the data format identification portion and the destination address from the first digital encoded audio data signal. The system will then generate and send a destination signal to an interface/controller. Based on the received destination address, the system will determine a required destination audio data format, either by having a single, known required destination audio data format or using a look-up table, which would correlate a plurality of destination addresses with their respective required audio data formats. Having determined the first digital encoded audio data signal format and the destination digital encoded audio data signal format, the system will then generate and send a translation signal to a signal translator.

The system will also transfer the data to the translator, in its first data format. The translator, in response to the translation signal, will then translate the first digital encoded audio data signal into a second digital encoded audio data signal utilizing a second digital encoded audio data signal format, which will be acceptable to the destination device. The system will appropriately route the signal to the proper destination based on the destination address. The data may be transferred over the public switched telephone network, a computer network such as a local area network, wide area network, intranet, the Internet or World Wide Web, or any other TCP/IP network.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
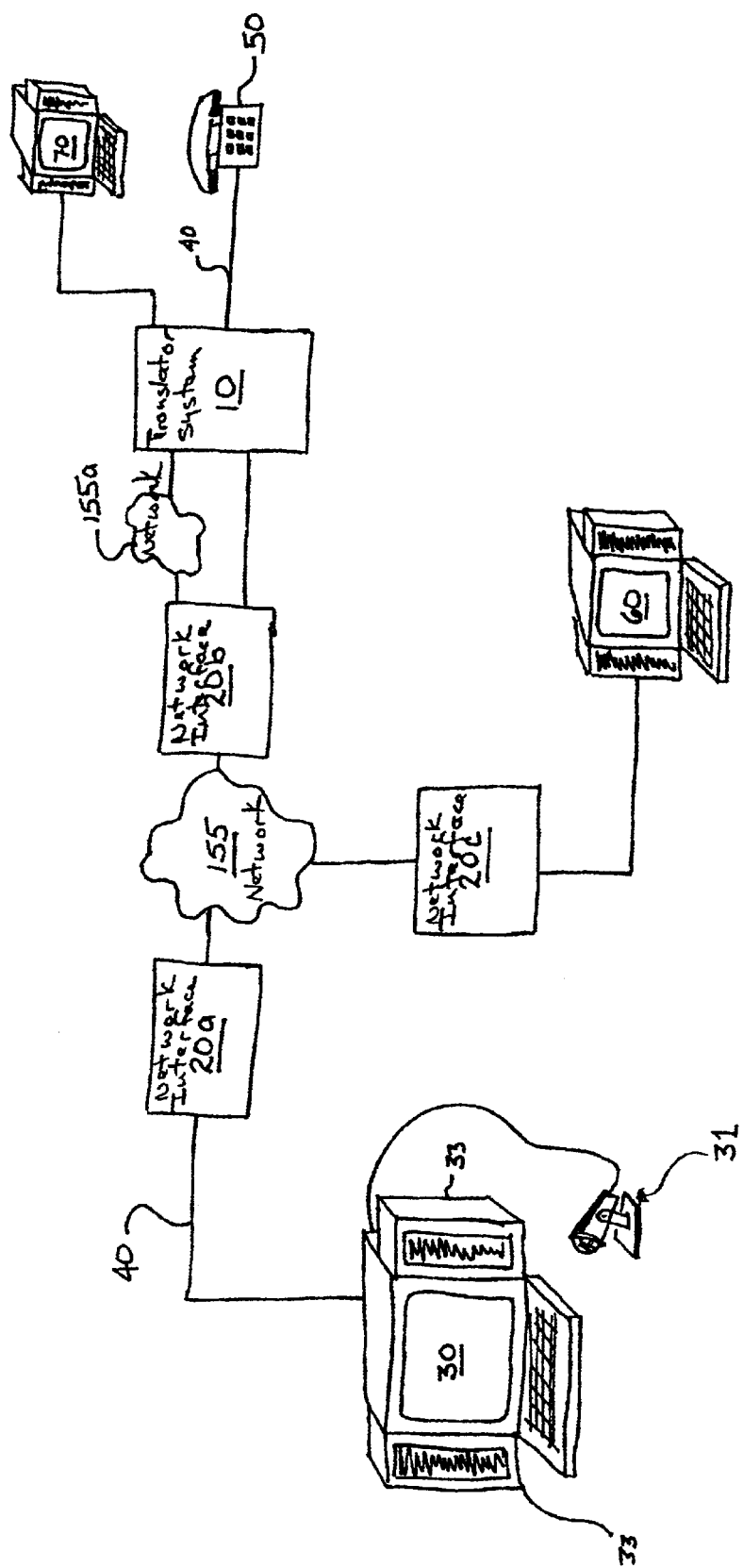
FIG. 1 is a schematic block diagram of the audio communication system of the present invention.

FIG. 1 shows a system for providing audio communication over a computer network between sending and receiving devices using differing communication formats, according to the present invention. The system 10 interfaces with a first audio transceiver device 30, typically having a connection to the public switched telephone network (PSTN) 40, although different types of connections are contemplated. The first audio transceiver device 30 may be, for example, a personal computer with an audio input/output capability such as a headset or microphone 31 and speakers 33, a modem standard telephone line or an Integrated Services Digital Network (ISDN) line.

The PSTN 40 connects the first audio transceiver device 30 to a first computer network interface 20a, if necessary, which interfaces the first audio transceiver device 30 to a computer network 155. The computer network 155 may be, for example, the global computer network known as the internet or any other local area network (LAN) or wide area network (WAN). In the example that utilizes the internet as the computer network, the first computer network interface 20a receives a wide area network (WAN) internet protocol (IP) signal, such as point-to-point protocol (PPP), and connects the WAN IP signal to the internet TCP/IP network.

Typically, the first transceiver device 30 receives audio signals, such as from microphone 31, and, based on the audio communication software being run, converts the audio signals to a first digital encoded audio data signal having a first data format based specifically on the audio communication software being used. In one example, the data format is a protocol packet compression from a raw audio stream according to a compression algorithm. Examples of audio communication software include Cooltalk, CUSeeMe, NetMeeting, Webtalk, and Freely Speaking.

If the first transceiver device 30 is coupled to a transmission line, such as PSTN 40, the first digital encoded audio data signal will be a serial WAN IP signal, which will be converted to TCP/IP network protocol by computer network interface 20a. The computer network 155 is typically the Internet or World Wide Web, although any local area network, intranet, or wide area network, is considered to be an equivalent computer network.

The computer network 155 is then coupled to the digital encoded audio signal translator system 10 via a second computer network interface 20b either directly or via a second computer network 155a. The digital encoded audio data signal translator system 10 will first identify the data format of the received digital encoded audio data signal in the manner discussed below. It will then identify the desired destination of the received digital encoded audio data signal and identify a destination audio data signal format, which is acceptable to the desired destination device. The digital encoded audio data signal translator system 10 will then translate the received digital encoded audio data signal into a destination audio data signal, which utilizes the destination audio data signal format. Finally, the digital encoded audio data signal protocol translator system 10 will transmit the destination audio data signal to the desired destination device.

The desired destination device may include a standard telephone 50, in which case the digital encoded audio data signal translator 10 will translate the received digital encoded audio data signal into an analog destination signal for transmission over the PSTN 40. On the other hand, if the desired destination device is a local digital voice communication system 70, the digital encoded audio signal translator 10 will translate the received digital encoded audio data signal into a digital encoded destination audio data signal in a format compatible with the local digital voice communication system 70. For example, a telemarketing organization may have several computer terminals capable of converting a particular digital encoded audio data signal to an audio output and an audio input to a particular digital encoded audio data signal. In this case, the digital encoded audio data signal translator 10 may serve several second audio transceiver devices and be connected to the second audio transceiver devices via a company LAN, WAN, or Internet.

As a third option, the digital encoded audio signal translator system 10 may reformat the received digital encoded audio data signal into a digital encoded destination audio data signal, which it would re-address and transmit to a remote destination device 60 via the second computer network interface 20b, the Internet, World Wide Web 155 and a third computer network interface 20c.

Figure 2:
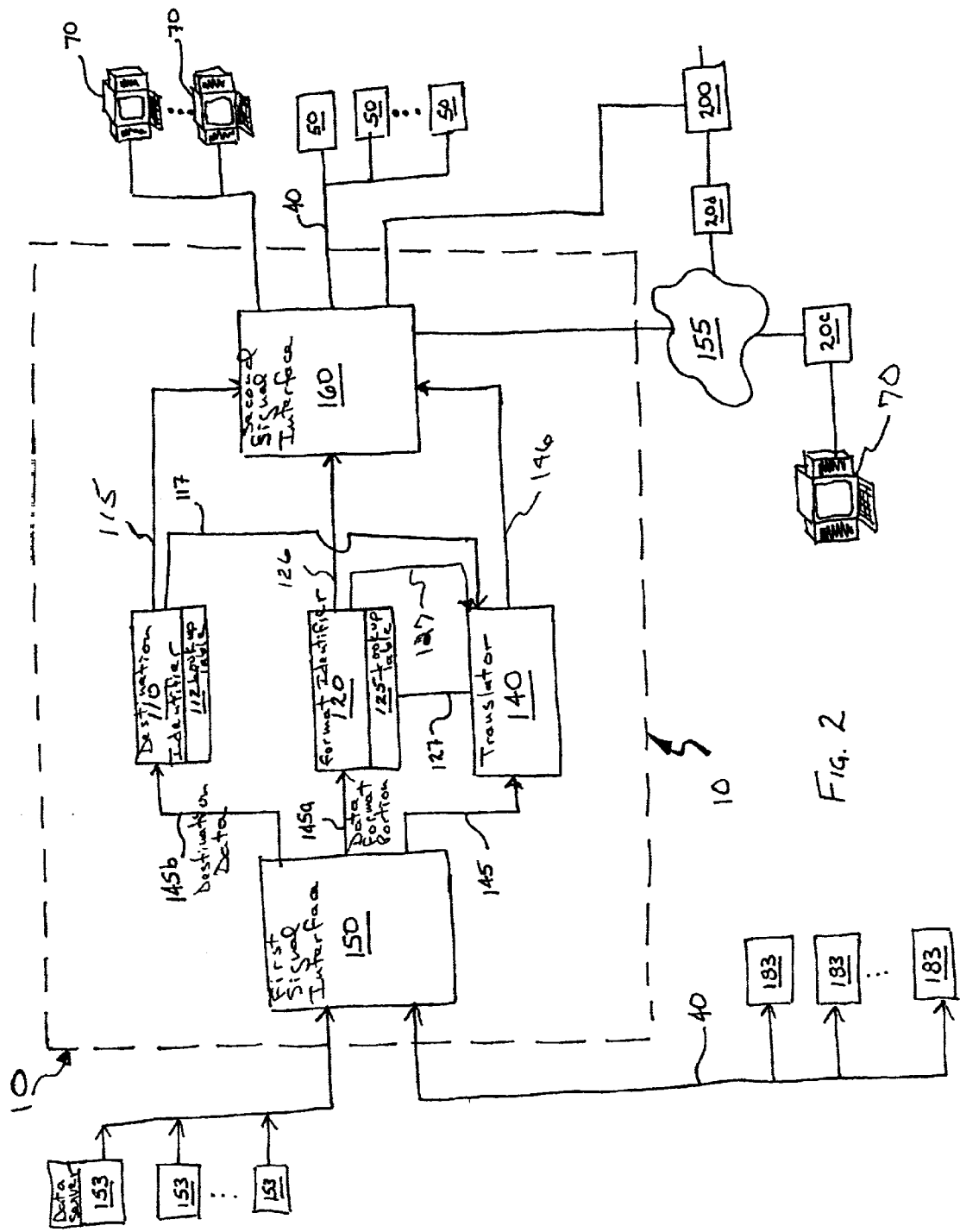
FIG. 2 is a schematic block diagram of a digital encoded audio signal protocol translator in the audio communication system, according to one embodiment of the present invention.

Referring now to FIG. 2, the digital encoded audio data signal translator system 10 of the present invention comprises a first digital audio signal interface 150, which may receive data either digitally from a data server 153 or in analog form from standard telephone sets 183 over the PSTN 40. The data server 153 is typically a computer network interface which will interface the first digital audio signal interface 150 to a computer network such as the Internet or World Wide Web. It is understood by one skilled in the art that other forms of computer networks may be used instead of the Internet or World Wide Web. These networks include but are not limited to local area networks (LAN), wide area networks (WAN), company intranet networks, or other TCP/IP networks.

The first digital audio signal interface 150 may also have an analog audio input to receive audio data from standard telephones. Typically there would be a private branch exchange (PBX)(not shown) interfacing the first digital audio signal interface 150 to the PSTN 40, although it is conceivable to one skilled in the art that a direct dial-in line would be available.

The first digital audio signal interface 150 receives the data, either analog audio or digital, and will first identify the data format used by the sending audio transceiver device. By data format, we mean both a data protocol as a standard way of relaying data transmission between computers and also a data format, i.e., a method of arranging data for transmission between computers, such as data compression formats according to different types of compression algorithms. It will be seen by one of ordinary skill in the art that a protocol may require a particular data compression format or that a particular data format may also include a particular data protocol.

The first digital audio signal interface 150, will identify the data format of the received data signal and provide a digital encoded audio data signal format identification portion 145a to the format identifier 120. The first digital audio signal interface 150 will also identify the destination portion of the incoming data 145*b*. The first digital audio signal interface 150 will then provide the destination identification portion 145*b* of the incoming data to the destination identifier 110. The destination identifier 110 will then generate a destination identification signal 115, which it will provide to a second digital audio signal interface and controller 160, such as a PBX. The destination identifier 110 may also contain a look-up table 112, which will correlate destination devices with their required destination signal formats. Based on the look-up table, the destination identifier 110 will also generate a destination format signal 117, which represents a data format that is compatible with the desired destination device. The destination format signal 117 is provided to the translator 140.

The format identifier 120 also contains a look-up table 125, which will receive as its input, the digital encoded audio data signal format identification portion 145*a* of the received audio data signal. The format identifier 120 accesses its look-up table 125 and identifies and generates a format identification signal 126 and format translation signal 127. The format identification signal 126 is provided to the second digital audio signal interface and controller 160, while the format translation signal 127 is provided to the translator 140.

The first digital audio signal interface 150 also sends the entire first digital encoded audio data signal 145 to the translator 140. Based on the received format translation signal 127 and the received destination format signal 117, the translator 140 then converts and/or translates the data from the received audio data signal format to the destination audio data signal format and transfers the translated data 146 to the second digital audio signal interface and controller 160. For example, the translator 140 can translate audio data compressed using one type of compression algorithm to audio data compressed with another type of compression algorithm that can be processed at the processor speed of the destination computer 170.

The second digital audio signal interface and controller 160 will then utilize the destination identification signal 115, the format identification signal 126, and the translated destination data signal 146 from the translator, and determine the appropriate routing and control signals required for proper delivery of the data to the desired destination device 50, 70.

Data delivery may involve the transmission of the translated audio data 146 to a local second audio transceiver device, which may include a computer 70 with a particular digital audio communication package installed on it. In this case, the second digital audio signal interface 160 would transmit the translated audio data 146 directly to the receiving device.

In the alternative, the translated audio data 146, may be transmitted, in its translated, digital format, over a computer network 155, such as the Internet or World Wide Web to a remote destination device, such as remote computer 70, which accesses computer network 155 via data interface 20*c*.

In addition, the second digital audio signal interface 160 may itself convert the translated digital audio data signal 146 to a translated analog audio data signal 146*a*, which it could transmit via the PSTN 40 to a standard telephone 50.

Finally, the translated digital audio data 146 may be transmitted by the second digital audio signal interface 160 to one or more remote data server 200, which would further route the translated audio data signal to a specific destination device (not shown). The remote data server(s) may be connected to the second digital audio signal interface 160 using either a dedicated data connection 202 or using the Internet 155 via a fourth data interface 20(*d*).

Figure 3:
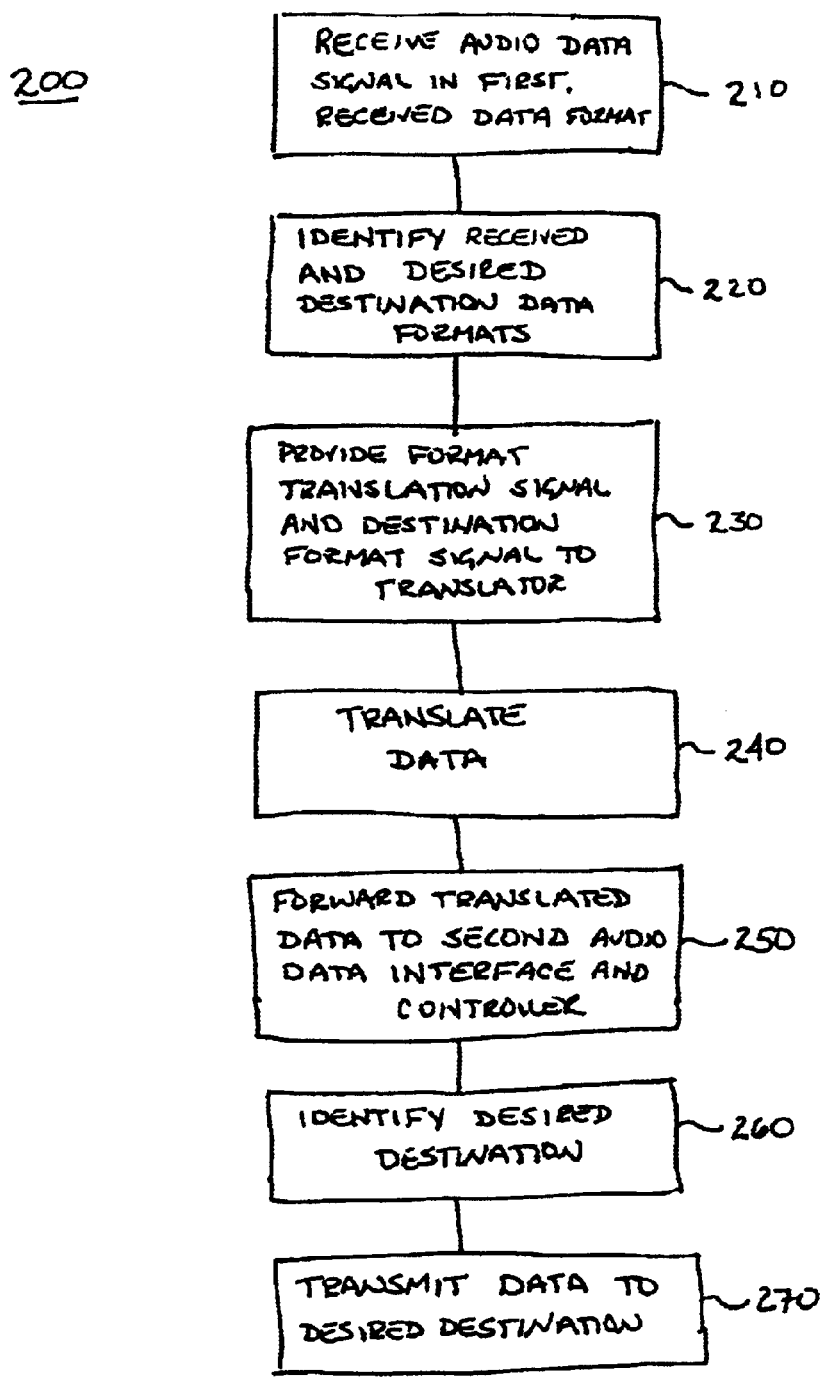
FIG. 3 is a flow chart showing the audio communication method according to the present invention.

FIG. 3 provides a flowchart of a method 200 of providing audio communication over a computer network using differing communication formats, according to the present invention. The first step is to receive digitized audio data, at a first digital audio signal interface, step 210. The received digitized audio data utilizes a first digital encoded audio data signal format. The received audio data signal includes at least a destination identification portion 145*b* and a format identification portion 145*a*. Since a principle object of the present invention is to provide a system and method of translating audio data, it is assumed that the desired destination device will utilize a second digital encoded audio data signal format, which is different from the first. Therefore, the next step is to identify the first, received audio signal format and the second, destination audio signal format, step 220. While the received audio signal format can be readily determined from the received identification portion of the received signal, it will be appreciated that in order to properly translate the received audio data signal into a format that is compatible with the desired destination device, the destination data format must be either known or determined.

There are several methods by which the destination data format may be known or determined. For example, the destination device may be co-located with the second digital audio signal interface and controller/PBX 160 (FIG. 2). This would be the case at, for example, at a telemarketing firm. At a telemarketing firm that utilizes the present invention it is clear that all of the destination devices will share a common destination data format. Thus, in this scenario, the destination data format will be known and the problem of identifying the destination protocol will not exist.

In another example, customers may subscribe or join a service for receiving audio communications across a computer network. In this example, the customers would need to supply the appropriate audio data signal format required by their system for proper translation thereof to the service provider as part of the subscription process. The appropriate destination data format would then be stored, for example in the look-up table 125 (FIG. 2) at a format identifier maintained by the service provider.

In a third example, the second digital audio signal interface and controller 160 (FIG. 2) would poll the destination device in order to determine the destination format. This could be accomplished by simply providing a query requiring the transmission of a simple digitized audio or other signal as its response. Since the signal response, like the original received audio data signal, will also have a format identification portion, the task of identifying the destination audio data format is not difficult.

In any event, once the received audio data format and the destination audio data format are known, the format identifier and destination identifier will provide the proper format translation signal and destination format signal, respectively to the format translator, step 230. In the next step, step 240, the format translator translates the received audio data signal into the desired destination format.

The translated audio data signal is then forwarded to a second audio signal interface, step 250. In addition to receiving the translated audio data signal, the second audio signal interface receives the destination identification signal from the destination identifier to identify the desired destination of the translated audio data signal, step 260. Finally, the translated audio data is transmitted to the desired destination by the second audio data interface, step 270.

The second audio signal interface and controller is also responsible for generating the appropriate control signals to route the translated audio data to its desired destination. For example, to send an audio signal via the PSTN, the second digital audio signal interface must generate the necessary dual tone multiple frequency (DTMF) tones to dial the number. In another example, the second digital audio signal interface and controller/PBX will generate control signals for a modem in order to establish an Internet, World Wide Web connection. In a third example, the second digital audio signal interface and controller/PBX would generate the DTMF tones necessary to establish an ISDN connection.

Accordingly, the present invention provides a novel system and method for providing audio communication over a computer network between sending and destination devices utilizing differing audio data formats.

Modifications and substitutions by one of ordinary skills in the art are considered to be within the scope of the present invention which is not to be limited except by the claims which follow.

What is claimed is:

1. A system for transmitting audio data between at least first and second audio transceiver devices over a computer network, said first and second audio transceiver devices utilizing different audio data formats and respectively coupled to one or more transmission networks, wherein said first audio transceiver device receives audio signals and converts said received audio signal to a first digital encoded audio data signal having a first audio data format, an audio data signal format identification portion, and at least one destination device address portion identifying at least one destination device, and wherein said second audio transceiver device is located at a first destination and is operative as said at least one destination device, said system comprising:

a single first digital encoded audio data signal interface, responsive to said received audio signals, for providing said first digital encoded audio data signal, and for identifying and providing said audio data signal format identification portion signal, said first digital encoded audio data signal interface further responsive to said at least one destination device address portion, for providing a destination identification portion signal;

a single format identifier, responsive to said audio data signal format identification portion signal, for providing a format identification signal and a format translation signal;

a single destination identifier, responsive to said destination identification portion signal, for generating a destination identification signal and a destination format signal;

a single data translator, responsive to said format translation signal and to said destination format signal, for translating said first digital encoded audio data signal having a first format into a second digital encoded audio data signal having a second format, said second format acceptable to said destination device irrespective of which transmission networks the first and second audio transceiver devices are coupled to; and a single-second digital encoded audio data signal interface, responsive to said second digital encoded audio data signal, said destination identification signal and said format identification signal, for transmitting said second digital encoded audio data signal having a second format to said at least one destination device.

2. A system for transmitting audio data between sending and destination audio transceiver devices over a computer network, said sending and destination audio transceiver devices utilizing different audio data formats and respectively coupled to one or more transmission networks, wherein said sending audio transceiver device receives audio signals and converts said received audio signal to a first digital encoded audio data signal having: a first audio data format; an audio data signal format identification portion; and at least one destination device address portion identifying at least one destination device, and wherein said second audio transceiver device is located at a first destination and is operative as said at least one destination device, said system comprising:

a single first digital encoded audio data signal interface responsive to said first digital encoded audio data signal for receiving said first digital encoded audio data signal from said sending audio device, for identifying said audio data signal format identification portion, for generating a received audio signal format identification signal, for identifying said at least one destination address portion and for providing said at least one destination address portion to at least one destination device identifier, said at least one destination device identifier, responsive to said at least one destination address portion of said first digital encoded audio data signal, for generating at least one destination device identification signal;

a digital encoded audio data signal format identifier, responsive to said received audio signal format identification signal, for identifying said first audio data format and for providing a format translation signal;

a single digital encoded audio data signal translator, responsive to format translation signal and said first digital encoded audio data signal, for translating said first digital encoded audio data signal from said first data format into a second digital encoded audio data signal having a second data format acceptable to said destination audio device irrespective of which transmission networks the sending and destination audio transceiver devices are coupled to; and a single second digital audio data signal interface, responsive to said destination device identification signal, for transmitting said second digital encoded audio data signal to said destination device.

3. The system of claim 2 wherein said second audio transceiver device is also operative for receiving analog audio signals and wherein said at least a first audio transceiver device is also operative as at least a second destination device, and wherein said at least a second audio transceiver converts said received analog audio signal to at least a second digital encoded audio data signal having a second data protocol, at least a second digital encoded audio data signal protocol identification portion, and at least a second destination device address portion identifying at least a second destination device;

wherein said at least a second digital audio data signal interface is responsive to at least said second audio transceiver device, for receiving at least said second digital encoded audio data signal from said second audio transceiver device, for identifying at least said at least one digital encoded audio data signal identification portion, and responsive to said identification of at least said at least one digital encoded audio data signal identification portion, for providing at least a second digital encoded audio data signal protocol identification signal;

wherein said at least one digital encoded audio data signal protocol identifier is responsive to at least said at least a second digital encoded audio data protocol identification signal, for identifying said at least a second data protocol of said second digital encoded audio data signal, and for providing at least a second data protocol translation signal; and wherein said first digital audio data signal interface is responsive to said second destination device signal, for directing said translated second digital encoded audio data signal to said second destination device, for enabling said second destination device to broadcast said analog audio signals received from said second audio transceiver device.

4. The system of claim 2 wherein said second audio transceiver device is a standard telephone.

5. The system of claim 4 wherein said at least second digital encoded audio signal interface is a Private Branch Exchange.

6. The system of claim 5 wherein said Private Branch Exchange is connected to a Public Switched Telephone Network, and wherein said standard telephone is coupled to said Public Switched Telephone Network.

7. The system of claim 2 wherein at least said first audio transceiver device is a computer terminal.

8. The system of claim 2 wherein at least said second audio transceiver device is a computer terminal.

9. The system of claim 2 wherein said computer network is a TCP/IP Network.

10. The system of claim 2 wherein at least said second audio transceiver device is an ISDN phone.

11. A method of providing audio communications over a computer network between sending and destination audio transceiver devices respectively coupled to one or more transmission networks, said transceiver devices utilizing differing first and second digital encoded audio signal protocols, respectively, said method comprising the steps of:

receiving digitized audio data transmitted by said sending audio transceiver device at a single format translator, said received digitized audio data utilizing said first digital encoded audio data signal format and having a digital encoded audio data signal format identification portion and a destination identification portion;

identifying said first digital encoded audio signal format based on said received digital encoded audio data signal format identification portion;

searching a format translation signal lookup table and retrieving a format translation control signal corresponding to said first digital encoded audio signal format;

providing said retrieved format translation signal to a format translator; and translating said first digital encoded audio data signal at a single translator to a second digital encoded audio data signal, said second digital encoded audio data signal compatible with said second digital encoded audio data signal format;

providing a destination identification signal; and transmitting said second digital encoded audio data signal to said destination audio transceiver irrespective of which transmission networks the sending and destination audio transceiver devices are coupled to.

* * * * *